United States Patent
Wang et al.

(10) Patent No.: US 10,163,428 B2
(45) Date of Patent: *Dec. 25, 2018

(54) SYSTEM AND METHOD FOR CAPTURE AND RENDERING OF PERFORMANCE ON SYNTHETIC STRING INSTRUMENT

(71) Applicant: SMULE, INC., San Francisco, CA (US)

(72) Inventors: Ge Wang, Palo Alto, CA (US); Jeannie Yang, San Francisco, CA (US); Jieun Oh, Stanford, CA (US); Tom Lieber, Somerville, MA (US)

(73) Assignee: Smule, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,632

(22) Filed: May 1, 2017

(65) Prior Publication Data

US 2017/0372685 A1 Dec. 28, 2017

Related U.S. Application Data

(63) Continuation of application No. 14/323,667, filed on Jul. 3, 2014, now Pat. No. 9,640,160, which is a (Continued)

(51) Int. Cl.
*G10H 1/06* (2006.01)
*G10H 1/00* (2006.01)
*G06F 3/041* (2006.01)

(52) U.S. Cl.
CPC .......... *G10H 1/0016* (2013.01); *G06F 3/041* (2013.01); *G10H 1/0008* (2013.01);
(Continued)

(58) Field of Classification Search
CPC .......... G06F 3/04842; G10H 2220/096; G10H 2220/106; H04N 21/44222
See application file for complete search history.

(56) References Cited

U.S. PATENT DOCUMENTS

| 5,587,548 A | 12/1996 | Smith, III |
| 7,563,974 B2 | 7/2009 | Ozaki |

(Continued)

FOREIGN PATENT DOCUMENTS

| KR | 20070019090 | 2/2007 |
| KR | 20090091266 | 8/2009 |

OTHER PUBLICATIONS

Wang, Ge. "Designing Smule's iPhone Ocarina." Center for Computer Research in Music and Acoustics, Stanford University. Jun. 2009. Print. 5 pages.

(Continued)

*Primary Examiner* — Marlon Fletcher
(74) *Attorney, Agent, or Firm* — Haynes and Boone, LLP

(57) ABSTRACT

Synthetic multi-string musical instruments have been developed for capturing and rendering musical performances on handheld or other portable devices in which a multi-touch sensitive display provides one of the input vectors for an expressive performance by a user or musician. Visual cues may be provided on the multi-touch sensitive display to guide the user in a performance based on a musical score. Alternatively, or in addition, uncued freestyle modes of operation may be provided. In either case, it is not the musical score that drives digital synthesis and audible rendering of the synthetic multi-string musical instrument. Rather, it is the stream of user gestures captured at least in part using the multi-touch sensitive display that drives the digital synthesis and audible rendering.

20 Claims, 9 Drawing Sheets

Related U.S. Application Data continuation of application No. 13/292,773, filed on Nov. 9, 2011, now Pat. No. 8,772,621.

(60) Provisional application No. 61/411,900, filed on Nov. 9, 2010.

(52) U.S. Cl.
CPC ..... *G10H 1/0033* (2013.01); *G10H 2220/096* (2013.01); *G10H 2220/106* (2013.01); *G10H 2230/015* (2013.01); *G10H 2230/075* (2013.01); *G10H 2240/305* (2013.01)

(56) References Cited

U.S. PATENT DOCUMENTS

| | | |
|---|---|---|
| 7,906,720 B2 | 3/2011 | Delorme |
| 8,378,194 B2 | 2/2013 | Daisy |
| 2007/0180978 A1 | 8/2007 | Ozaki et al. |
| 2007/0221046 A1 | 9/2007 | Ozaki et al. |
| 2008/0254824 A1 | 10/2008 | Moraes |
| 2008/0280680 A1 | 11/2008 | Dutilly et al. |
| 2009/0312102 A1 | 12/2009 | Oberg et al. |
| 2010/0282044 A1 | 11/2010 | Delorme |
| 2011/0023688 A1 | 2/2011 | Daisy |
| 2011/0088535 A1 | 4/2011 | Zarimis |
| 2011/0107899 A1 | 5/2011 | Charles |
| 2011/0130204 A1 | 6/2011 | Delorme |
| 2011/0146477 A1 | 6/2011 | Tsukamoto |
| 2011/0185880 A1 | 8/2011 | Charles |
| 2011/0283868 A1 | 11/2011 | Behringer et al. |
| 2011/0316793 A1 | 12/2011 | Fushiki |
| 2012/0160079 A1 | 6/2012 | Little et al. |
| 2012/0174735 A1 | 7/2012 | Little et al. |
| 2012/0174736 A1* | 7/2012 | Wang .............. G10H 1/0008 84/622 |
| 2013/0036897 A1* | 2/2013 | Parks .............. G10H 1/368 84/483.2 |
| 2013/0180385 A1* | 7/2013 | Hamilton .......... G10H 1/0016 84/603 |

OTHER PUBLICATIONS

Geiger, G. "PDa: Real Time Signal Processing and Sound Generation on Handheld Devices" In Proceedings of the International Computer Music Conference, Barcelona, 2003, pp. 1-4.

G. Wang et al., "MoPhO: Do Mobile Phones Dream of Electric Orchestras?" In Proceedings of the International Computer Music Conference, Belfast, Aug. 2008.

G. Essl et al., "Mobile STK for Symbian OS." In Proceedings of the International Computer Music Conference, New Orleans, Nov. 2006.

G. Essl et al., "ShaMus—A Sensor-Based Integrated Mobile Phone Instrument." In Proceedings of the International Computer Music Conference, Copenhagen, Aug. 2007.

Robert Bristow-Johnson. "Wavetable Synthesis 101, A Fundamental Perspective." Web. <http://musicdsp.org/files/Wavetable-101.pdf>. Last accessed Mar. 15, 2012. pp. 1-27.

Pocket Guitar. Pocket Guitar Review by AppGuide. May 29, 2009. [Retrieved on Feb. 24, 2012]. <http://www.macworld.com/appguide/app.html?id-69168&expand=false>. entire document.

Geiger, G. "Using the Touch Screen as a Controller for Portable Computer Music Instruments" Proceedings of the 2006 International Conference on New Interfaces for Musical Expression (NIME06), Paris France, pp. 61-64.

Schiemer, G. and Havryliv, M. "Pocket gamelan: tuneable trajectories for flying sources in Mandala 3 and Mandala 4", In Proceedings of the 2006 Conference on New Interfaces for Musical Expression, Jun. 2006, Paris France, pp. 37-42.

Tanaka, A. "Mobile Music Making" In Proceedings of the 2004 Conference on New Interfaces for Musical Expression, Jun. 2004, pp. 154-156.

Pakarinen et al. "Review of Sound Synthesis and Effects Processing for Interactive Mobile Applications." Report No. 8, Department of Signal Processing and Acoustics (TKK) Report Series. Mach 23, 2009. [Retrieved: Feb. 24, 2012]. Web. http://www.acoustics.hut.fi/publications/papers/mobilesynthandfxreport/mobilesynthandfxreport.pdf entire document.

\* cited by examiner

SCORE CODED NOTE CUE 402

SCORE CODED NOTE CUE 401

TOUCH SCREEN BOWING DEVICE 421

NEXT NOTE CUE

CURRENT NOTE CUE

TOUCH SCREEN BOWING DEVICE 421

VIBRATO CUE 405

STRING LENGTH INDICATIVE FINGER CONTACT 431

SCORE CODED NOTE CUE 403

VIBRATO CUE 406

FINGER CONTACT 432

SYSTEM AND METHOD FOR CAPTURE AND RENDERING OF PERFORMANCE ON SYNTHETIC STRING INSTRUMENT

CROSS-REFERENCE TO RELATED APPLICATION(S)

The present application is a continuation of U.S. patent application Ser. No. 14/323,667, filed on Jul. 3, 2014 which is a continuation of U.S. patent application Ser. No. 13/292,773, filed on Nov. 9, 2011 now U.S. Pat. No. 8,772,621, which claims the benefit of U.S. Provisional Application No. 61/411,900, filed Nov. 9, 2010, the entirety of each of these disclosures being incorporated herein by reference.

BACKGROUND

Field of the Invention

The invention relates generally to musical instruments and, in particular, to techniques suitable for use in portable device hosted implementations of musical instruments for capture and rendering of musical performances.

Description of the Related Art

The field of mobile music has been explored in several developing bodies of research. See generally, G. Wang, *A Designing Smule's iPhone Ocarina*, presented at the 2009 on *New Interfaces for Musical Expression*, Pittsburgh (June 2009) and published at https://ccrma.stanford.edu/~ge/publish/ocarina-nime2009.pdf. One application of this research has been the Mobile Phone Orchestra (MoPhO), which was established in 2007 at Stanford University's Center for Computer Research in Music and Acoustics and which performed its debut concert in January 2008. The MoPhO employs more than a dozen players and mobile phones which serve as a compositional and performance platform for an expanding and dedicated repertoire. Although certainly not the first use of mobile phones for artistic expression, the MoPhO has been an interesting technological and artistic testbed for electronic music composition and performance. See generally, G. Wang, G. Essl and H. Penttinen, *MoPhO: Do Mobile Phones Dream of Electric Orchestras?* in *Proceedings of the International Computer Music Conference*, Belfast (August 2008).

Mobile phones and other portable computing devices are growing in sheer number and computational power. Hyperubiquitous and deeply entrenched in the lifestyles of people around the world, they transcend nearly every cultural and economic barrier. Computationally, the mobile phones and pad-type devices of today offer speed and storage capabilities comparable to desktop computers from less than ten years ago, rendering them surprisingly suitable for real-time sound synthesis and other musical applications. Like traditional acoustic instruments, the mobile phones are intimate sound producing devices. By comparison to most instruments, they are somewhat limited in acoustic bandwidth and power. However, mobile phones have the advantages of ubiquity, strength in numbers, and ultramobility, making it feasible to hold jam sessions, rehearsals, and even performance almost anywhere, anytime.

Research to practically exploit such devices has been ongoing for some time. For example, a touch-screen based interaction paradigm with integrated musical synthesis on a Linux-enabled portable device such as an iPaq™ personal digital assistant (PDA) was described by Geiger. See G. Geiger, *PDa: Real Time Signal Processing and Sound Generation on Handheld Devices*, in *Proceedings of the International Computer Music Conference*, Singapore (2003); G. Geiger, *Using the Touch Screen as a Controller for Portable Computer Music Instruments* in *Proceedings of the International Conference on New Interfaces for Musical Expression*, Paris (2006). Likewise, an accelerometer based custom-made augmented PDA capable of controlling streaming audio was described by Tanaka. See A. Tanaka, *Mobile Music Making*, in *Proceedings of the 2004 Conference on New Interfaces for Musical Expression*, pages 154-156 (2004).

Indeed, use of mobile phones for sound synthesis and live performance was pioneered by Schiemer in his Pocket Gamelan instrument, see generally, G. Schiemer and M. Havryliv, *Pocket Gamelan: Tuneable Trajectories for Flying Sources in Mandala 3 and Mandala 4*, in *Proceedings of the 2006 Conference on New Interfaces for Musical Expression*, pages 37-42, Paris, France (2006), and remains a topic of research. The MobileSTK port of Cook and Scavone's Synthesis Toolkit (STK) to Symbian OS, see G. Essl and M. Rohs, *Mobile STK for Symbian OS*, in *Proceedings of the International Computer Music Conference*, New Orleans (2006), was perhaps the first full parametric synthesis environment suitable for use on mobile phones. Mobile STK was used in combination with accelerometer and magnetometer data in ShaMus to allow purely on-the-phone performance without any laptop. See G. Essl and M. Rohs, *ShaMus—A Sensor-Based Integrated Mobile Phone Instrument*, in *Proceedings of the International Computer Music Conference*, Copenhagen (2007).

As researchers seek to transition their innovations to commercial applications deployable to modern handheld devices such as iPad™ and iPhone® mobile digital devices (available from Apple Inc.) and other platforms operable within the real-world constraints imposed by processor, memory and other limited computational resources thereof and/or within communications bandwidth and transmission latency constraints typical of wireless networks, practical challenges present.

Improved techniques and solutions are desired.

SUMMARY

It has been discovered that, despite practical limitations imposed by mobile device platforms and applications, truly captivating musical instruments may be synthesized in ways that allow musically expressive performances to be captured and rendered in real-time. In some cases, the synthetic musical instruments can transform the otherwise mundane mobile devices into social instruments that facilitate performances in co-located ensembles of human performers and/or at distances that foster a unique sense of global connectivity.

Accordingly, techniques have been developed for capturing and rendering musical performances on handheld or other portable devices using signal processing techniques suitable given the somewhat limited capabilities of such devices and in ways that facilitate efficient encoding and communication of such captured performances via wireless networks. The developed techniques facilitate the capture, encoding and use of gesture streams for rendering of a musical performance. In some embodiments, a gesture stream encoding facilitates audible rendering of the musical performance locally on the portable device on which the musical performance is captured, typically in real time. In some embodiments, a gesture stream efficiently codes the musical performance for transmission from the portable device on which the musical performance is captured to (or toward) a remote device on which the musical performance is (or can be) rendered. Indeed, is some embodiments, a gesture stream so captured and encoded may be rendered both locally and on remote devices using substantially identical or equivalent instances of a digital synthesis of the musical instrument executing on the local and remote devices.

In general, rendering includes synthesis of tones, overtones, harmonics, perturbations and amplitudes and other performance characteristics based on the captured (and often transmitted) gesture stream. In some cases, rendering of the performance includes audible rendering by converting to acoustic energy a signal synthesized from the gesture stream encoding (e.g., by driving a speaker). In some cases, the audible rendering is on the very device on which the musical performance is captured. In some cases, the gesture stream encoding is conveyed to a remote device whereupon audible rendering converts a synthesized signal to acoustic energy.

Thus, in some embodiments, a synthetic musical instrument (such as a synthetic violin, guitar or other multi-string instrument) allows the human user to control an expressive physical model or wavetable synthesis of a vibrating string and resonant body, using a multi-touch sensitive display to express string length and/or excitation indicative gestures (e.g., bowing, strumming, fingers on strings, plucking of strings, damping, etc.). The user actually causes the sound and controls the parameters affecting pitch, timbre, quality, etc. When a user plays with a musical score, which may also provide accompaniment, the visual cues generated based on the musical score suggest to the player what and how to play and when (typically with fingering positions and note extents, but in some embodiments, also by marking gestures and performance figures such as vibrato, trills, etc.). The user is free to go off and improvise, double the intended notes at the octave or other interval, do other ornaments, play spontaneous counterpoint, etc. They can also opt to play the notes and figures indicated as accurately as possible, to achieve a high score. When combined with the optional right-hand iPhone (device B) bowing controller, the user has even more expressive power, and more responsibility for the performance.

In some embodiments, a storybook mode provides lesson plans which teach the user to play the synthetic instrument and exercise. User performances may be graded (or scored) as part of a game (or social-competitive application framework), and/or as a proficiency measure for advancement from one stage of a lesson plan to the next. In general, better performance lets the player (or pupil) advance faster. High scores both encourage the pupil (user) and allow the system to know how quickly to advance the user to the next level and, in some cases, along which game or instructive pathway. In each case, the user is playing a real/virtual physical model of an instrument, and their gestures actually control the sound, timing, etc.

Often, both the device on which a performance is captured and that on which the corresponding gesture stream encoding is rendered are portable, even handheld devices, such as pads, mobile phones, personal digital assistants, smart phones, media players, book readers, laptop or notebook computers or netbooks. In some cases, rendering is to a conventional audio encoding such as AAC, MP3, etc. In some cases, rendering to an audio encoding format is performed on a computational system with substantial processing and storage facilities, such as a server on which appropriate CODECs may operate and from which content may thereafter be served. Often, the same gesture stream encoding of a performance may (i) support local audible rendering on the capture device, (ii) be transmitted for audible rendering on one or more remote devices that execute a digital synthesis of the musical instrument and/or (iii) be rendering to an audio encoding format to support conventional streaming or download.

In some embodiments in accordance with the present invention(s), a method includes using a first portable computing device as a synthetic string instrument; presenting on a multi-touch sensitive display of the portable computing device, and in correspondence with a musical score, temporally synchronized visual cues relative to respective strings of the synthetic string instrument; capturing user gestures indicative of length of respective strings of the synthetic string instrument from data sampled in correspondence with respective finger contacts with the multi-touch sensitive display along visual depictions of the respective strings; and capturing user gestures indicative of excitation of at least one of the strings. The method further includes encoding a gesture stream for a performance of the user by parameterizing at least a subset of the string length and string excitation indicative user gestures; and audibly rendering the performance on the portable computing device using the encoded gesture stream as an input to a digital synthesis of the synthetic string instrument executing on the first portable computing device, wherein the captured gesture stream, and not the musical score itself, drives the digital synthesis. In some embodiments, the string excitation indicative gestures are distinct from the string length indicative gestures.

In some embodiments, the digital synthesis includes a model of acoustic response for one of a violin, a viola, a cello and a double bass; and the captured string excitation indicative gestures include a bow traversal gesture indicated by contact of the user's thumb or finger with a rotating visual on the multi-touch sensitive display. In some case, radial excursion of the user's thumb or finger contact with the rotating visual is indicative of bow speed. In some cases, the captured string excitation indicative gestures further include pluck- or strum-type gestures indicated by contact of the user's thumb or finger with respective visual indications of the strings.

In some embodiments, the digital synthesis is of one of a guitar, banjo, ukulele, lute or setar; and the captured string excitation indicative gestures include pluck- or strum-type gestures indicated by contact of the user's thumb or finger with respective visual indications of the strings. In some cases, the digital synthesis includes wavetable or frequency modulation synthesis in correspondence with the parameterization of at least the string length indicative user gestures. In some cases, the digital synthesis includes physical model of acoustic response for the guitar, banjo, ukulele, lute or setar.

In some embodiments, the method further includes, responsive to a user selection on the multi-touch sensitive display, retrieving an encoding of the musical score via the communications interface.

In some embodiments, the method further includes grading the user's performance based at least in part on correspondence of captured finger contact gestures with notes or positions and timings encoded in the musical score. In some embodiments, the method further includes grading the user's performance based at least in part on correspondence of captured finger contact gestures with vibrato, trilling or other spatio-temporal effects encoded in the musical score.

In some embodiments, the method further includes presenting on the multi-touch sensitive display a lesson plan of exercises, wherein the captured gesture stream corresponds to performance by the user of a particular one of the exercises; and advancing the user to a next exercise of the lesson plan based on a grading of the user's performance of the particular exercise.

In some embodiments in accordance with the present invention(s), a method includes using a first portable computing device as a synthetic string instrument, capturing user gestures relative to respective strings of the synthetic string instrument from data sampled in correspondence with respective finger contacts with a multi-touch sensitive display of the portable computing device and capturing user gestures indicative of bow traversal of at least one of the strings. A gesture stream is encoded for a performance of the user by parameterizing at least a subset of events captured from the finger contacts and bow traversal, the performance is then audibly rendered on the portable computing device using the encoded gesture stream as an input to a digital synthesis of the synthetic string instrument executing on the first portable computing device. In some cases, temporally synchronized visual cues are presented on the multi-touch sensitive display in correspondence with a musical score to guide the user's gestures relative to the respective strings of the synthetic string instrument. The gesture stream captured from the user's performance, and not the musical score itself, drives the digital synthesis.

In some cases, user gestures indicative of bow traversal are captured in correspondence with thumb or finger contact with the multi-touch sensitive display. In some cases, the method includes dynamically correcting captured finger contact gestures in accord with notes or positions encoded in the musical score.

In some cases, the method includes grading the user's performance based at least in part on correspondence of captured finger contact gestures with notes or positions and timings encoded in the musical score. In some cases, the method includes grading the user's performance based at least in part on correspondence of captured finger contact gestures with vibrato, trilling or other spatio-temporal effects encoded in the musical score.

In some embodiments, the method further includes manipulating a second portable device relative to the first, wherein the user gestures indicative of bow traversal include lateral movement and inclination of the second portable device captured in correspondence with the manipulation. In some cases, the second portable computing device includes either or both of multi-axis accelerometer and a gyroscopic sensor for capture of orientation and motion dynamics of the second portable computing device. In such cases, the second portable computing device is configured to compute and wirelessly communicate to the first portable computing device the bow traversal gestures based on the captured orientation and motion dynamics. In some cases, the method includes capturing at a multi-touch sensitive display of the second portable computing device further user gestures indicative of one or more of bow pressure and bow-on-string.

In some cases, the method further includes grading the user's performance based at least in part on correspondence of one or more parameterizations of the captured bow traversal gestures with bowing techniques encoded in the musical score, wherein the one or more parameterizations are selected from the set of speed of travel, position of a sounding point, and method of attack.

In some cases, the method includes presenting on the multi-touch sensitive display a lesson plan of exercises, wherein the captured gesture stream corresponds to performance by the user of a particular one of the exercises and advancing the user to a next exercise of the lesson plan based on a grading of the user's performance of the particular exercise.

In some cases, the first portable computing device includes a communications interface, and the method further includes transmitting the encoded gesture stream via the communications interface for rendering of the performance on a remote device.

In some cases, the digital synthesis includes a model of acoustic response for one of a violin, a viola, a cello and a double bass. In some cases, the first and/or second portable computing devices are each selected from the group of: a compute pad, a laptop computer, notebook computer or netbook; a personal digital assistant or book reader; and a mobile phone or media player. In some cases, the remote device includes a server from which the rendered performance is subsequently supplied as one or more audio encodings thereof.

In some cases, the method further includes audibly rendering a second performance on the portable computing device using a second gesture stream encoding received via the communications interface directly or indirectly from a second remote device, the second performance rendering using the received second gesture stream encoding as an input to the digital synthesis of the musical instrument. In some cases, the method further includes geocoding the transmitted gesture stream and displaying a geographic origin for, and in correspondence with audible rendering of, a third performance encoded as a third gesture stream received via the communications interface directly or indirectly from a third remote device.

In some embodiments, a computer program product is encoded in one or more non-transitory media, the computer program product including instructions executable on a processor of the portable computing device to cause the portable computing device to perform one or more of the aforementioned methods. In some cases, media are readable by the portable computing device or readable incident to a computer program product conveying transmission to the portable computing device.

In some embodiments, an apparatus includes a portable computing device having a multi-touch display interface and machine readable code executable on the portable computing device to implement a synthetic musical instrument. The machine readable code includes instructions executable to capture both: (i) user gestures relative to respective strings of the synthetic string instrument from data sampled in correspondence with respective finger contacts with a multi-touch sensitive display of the portable computing device and (ii) user gestures indicative of bow traversal of at least one of the strings and to encoded a gesture stream for a performance of the user by parameterizing at least a subset of events captured from the finger contacts and bow traversal. The machine readable code is further executable to audibly render the performance on the portable computing device using the encoded gesture stream as an input to a digital synthesis of the synthetic string instrument executing on the portable computing device.

In some cases, the apparatus is configured to wirelessly communicate with a second portable computing device proximate thereto. The second portable computing device includes either or both of multi-axis accelerometer and a gyroscopic sensor for capture of orientation and motion dynamics of the second portable computing device. Machine readable code is executable on the second portable computing device to compute and wirelessly communicate to the first portable computing device the bow traversal gestures based on the captured orientation and motion dynamics. In some cases, the apparatus is embodied as one or more of a compute pad, a handheld mobile device, a mobile phone, a laptop or notebook computer, a personal digital assistant, a smart phone, a media player, a netbook, and a book reader.

Finally, in some embodiments a computer program product is encoded in non-transitory media and includes instructions executable to implement a synthetic musical instrument on a portable computing device having a multi-touch display interface. In particular, the computer program product encodes instructions executable to capture both: (i) user gestures relative to respective strings of the synthetic string instrument from data sampled in correspondence with respective finger contacts with a multi-touch sensitive display of the portable computing device and (ii) user gestures indicative of bow traversal of at least one of the strings and to encode a gesture stream for a performance of the user by parameterizing at least a subset of events captured from the finger contacts and bow traversal The computer program product encodes further instructions executable to audibly render the performance on the portable computing device using the encoded gesture stream as an input to a digital synthesis of the synthetic string instrument executing on the portable computing device.

These and other embodiments in accordance with the present invention(s) will be understood with reference to the description herein as well as the drawings and appended claims which follow.

BRIEF DESCRIPTION OF THE DRAWINGS

The present invention is illustrated by way of example and not limitation with reference to the accompanying figures, in which like references generally indicate similar elements or features.

FIG. 1 depicts an individual performance use and FIG. 2 depicts performances as an ensemble.

FIG. 4A illustrates a pair of temporally sequenced note cues presented in correspondence with an underlying score. FIG. 4B illustrates a pair of temporally sequenced note cues, together with a vibrato cue for the current note. FIG. 4C illustrates a current note cue, together with a vibrato cue for the current note and a desired user finger contact position in spatio-temporal correspondence with the underlying score. Each of the figures illustrate a touch screen bowing artifact or visual device, wherein in accord with some embodiments of the present invention, finger/thumb contact gestures are indicative of bow contact and radial position codes bow traversal speed.

Figure 1:
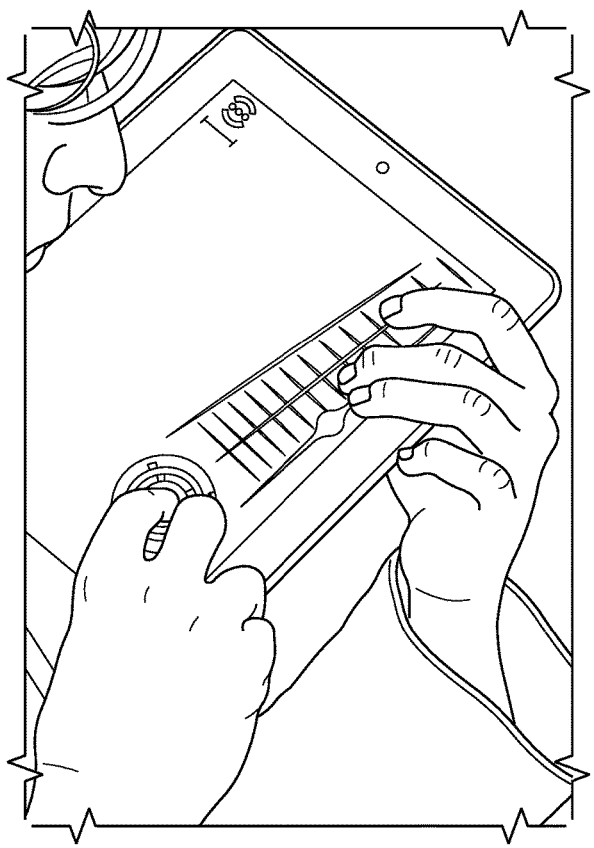
FIGS. 1 and 2 depict performance uses of a portable computing device hosted implementation of a synthetic violin in accordance with some embodiments of the present invention.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

Synthetic multi-string musical instruments have been developed for capturing and rendering musical performances on handheld or other portable devices in which a multi-touch sensitive display provides one of the input vectors for an expressive performance by a user/musician (hereafter the user). Visual cues may be provided on the multi-touch sensitive display to guide the user in a performance based on a musical score. Alternatively, or in addition, uncued freestyle modes of operation may be provided. In either case, it is not the musical score that drives digital synthesis and audible rendering of the synthetic multi-string musical instrument. Rather, it is the stream of user gestures captured at least in part using the multi-touch sensitive display that drives the digital synthesis and audible rendering. In some cases or embodiments, additional sources of user gestures, such as device motion captured by way of an accelerometer embedded in the portable device or proximate motion of another communicating device may contribute to the gesture stream that drives the digital synthesis and audible rendering.

In these ways and for some embodiments (particularly implementations of a bowed string instrument such as a violin, viola, cello, double bass, etc.), the user is able to control an actual expressive physical model of a string and resonant body using gestures captured on a multi-touch sensitive display (e.g., bowing, fingers on strings, plucking of strings, damping, etc.). For some embodiments (particularly those in which excitation of string vibration is by way of an impulse (e.g., a guitar, banjo, ukulele, lute, setar, etc.), wavetable synthesis techniques may be employed as a computationally efficient and attractive synthesis technique.

In either case, the user is actually causing the sound and controlling the parameters affecting pitch, timbre, quality, etc. When playing with a musical score, which may also provide accompaniment, the score contains indications to the user of what and how to play and when (typically with fingering positions and note extents, but in some embodiments, also marking gestures and performance figures such as vibrato, trills, string bending, etc.). The user is free to go off score and improvise double the intended notes at the octave or other interval, do other ornaments, play spontaneous counterpoint, etc. In game or lesson plan modes, the user may opt to play the notes and performance figures indicated as accurately as possible, so as to achieve a high score or to demonstrate ability to move on in a lesson plan.

In some cases, musical scores and/or lesson plans may be retrieved by a user via a communications interface as an "in-app" purchase. Generally, scores may be encoded in accord with any suitable coding scheme such as in accord with well known musical instrument digital interface (MIDI) standards, file formats and protocols (e.g., standard MIDI [.mid or .smf] formats, MIDI karaoke [.kar] formats; extensible music file, XMF formats; extensible MIDI [.xmi] formats; RIFF-based MIDI [.rmi] formats; extended RMID formats, etc.). In some cases, user performances may be uploaded and shared via such a communications interface. Often, performance uploads are encoded as the very gesture streams used to drive the digital synthesis and audible rendering on the local portable device. In some cases or additionally, local audible rendering is to a conventional audio encoding such as AAC, MP3, etc. In some cases, rendering to an audio encoding format is performed on a remote computational system with substantial processing and storage facilities, such as a server on which appropriate CODECs may operate and from which content may thereafter be served.

Much of the description herein emphasizes musical performance terminology, physical instrument analogs, user interface constructs and relevant gesture sets characteristic of a synthetic violin implementation wherein modeled strings are excited with a bow. Nonetheless, based on the description herein, persons of ordinary skill in the art will appreciate suitable modifications and/or extensions for other synthetic multi-string instruments. In particular, terminology, physical instrument analogs, user interface constructs and relevant gesture sets for multi-string instruments (including the described violin/fiddle, as well as guitar-type synthetic instruments) in which notes and chords are sounded using pluck- or strum-type excitation and gestures will also be understood. Likewise, although device, operating system and development platform aspects typical of iOS devices such as the iPad, iPod Touch and iPhone handhelds (available from Apple, Inc.) are emphasized, nothing herein shall be taken as limiting to a particular device, operating system or platform. iOS, iPad, iPod and iPhone are all trademarks of Apple, Inc. In view of the foregoing, and without limitation, we now describe certain illustrative embodiments.

Figure 2:
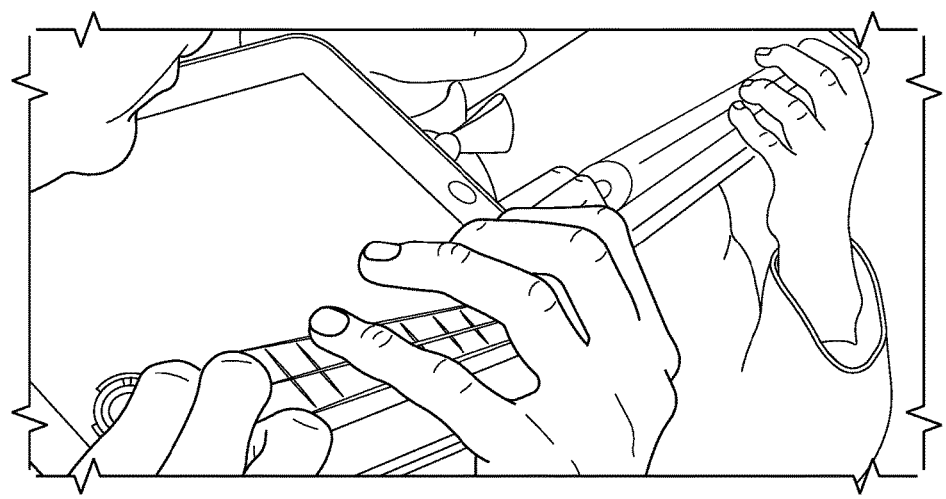

FIGS. 1 and 2 depict performance uses of a portable computing device hosted implementation of a synthetic violin in accordance with some embodiments of the present invention. In particular, FIG. 1 depicts an individual performance use of a pad-type computing device programmed to implement a simplified three (3) string synthetic violin. FIG. 2 depicts performances of multiple user musicians as an ensemble (on respective portable computing device hosted implementations of the synthetic violin).

User contacts with visual depictions of individual strings are captured using a multi-touch sensitive display, and these captured finger contacts constitute string length indicative gestures that are, in turn, fed to a digital synthesis of acoustic response of the violin together with excitation indicative gestures. Voicing of the synthetic violin is based on characteristics (materials, resonances, etc.) of the various acoustically significant components modeled. In this way, the user's finger contacts and, indeed, movement of finger contacts along a visually depicted string, dynamically vary the effective length of particular string as modeled and, accordingly, the frequency components (including harmonics) of acoustic energy digitally synthesized based on excitation.

Various excitation gestures may be captured and used to drive the digital synthesis. For example, in some embodiments, an additional finger (or thumb) contact with a rotating display feature provides the user interface analog of bow contact and transverse travel over one or more strings of the synthetic musical instrument. Location of such finger contact (i.e., closer to, or further from, the center of the rotating display feature) codes velocity of bow travel and affects modeled excitation of a particular string (or strings). In some embodiments, the breadth of the contact surface, the transient nature contact or other captured gestures may code bowing techniques that affect tone quality of the digital synthesis. In some embodiments, finger contacts along a portion of a particular string (as visually depicted on the multi-touch sensitive display) are captured as pluck-type excitation gestures. Together, the string length indicative gestures and the excitation indicative gestures are supplied to the digital synthesis as a gesture stream.

Figure 3:
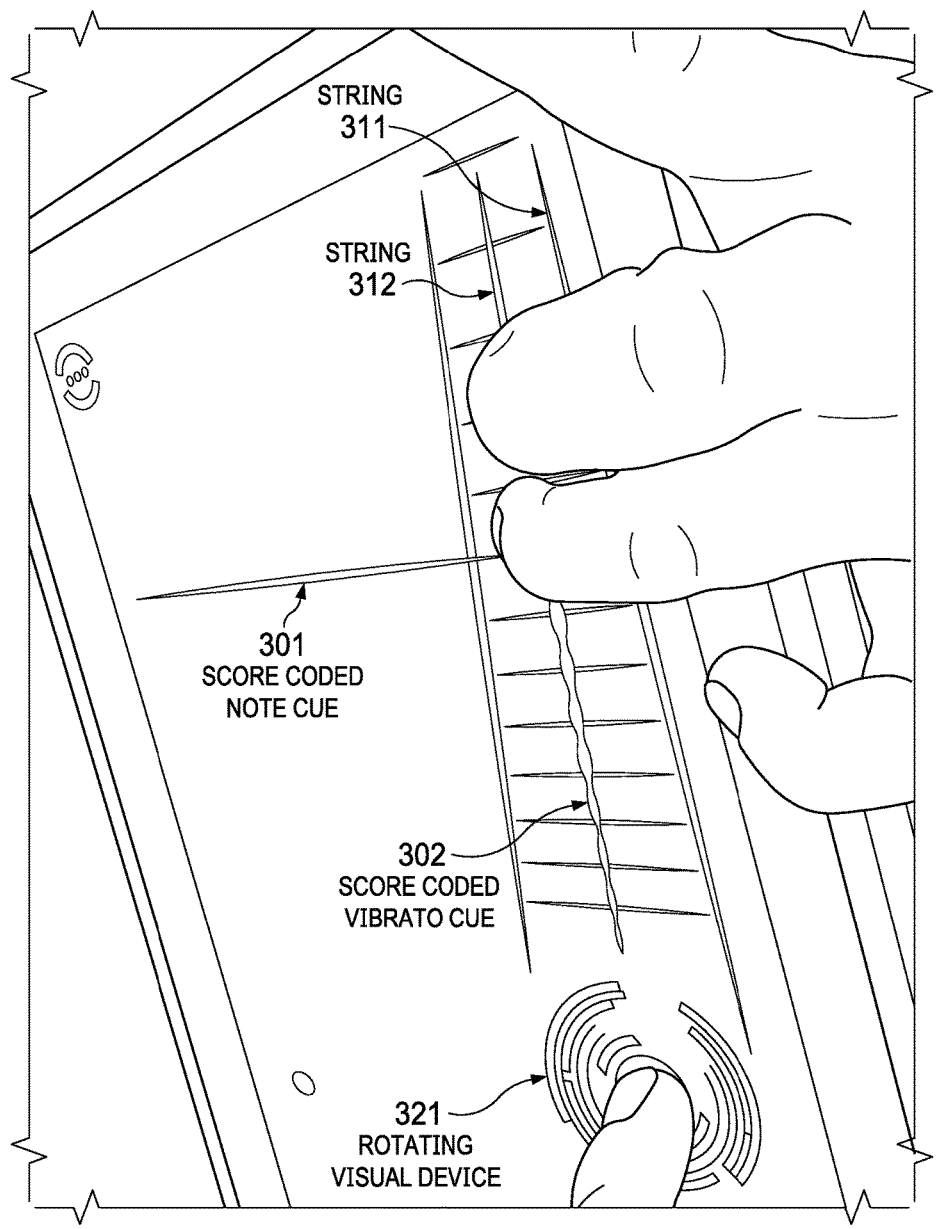
FIG. 3 illustrates certain aspects (including visual cuing and note sounding gestures) of a user interface design for a synthetic violin instrument in accordance with some embodiments of the present invention.

FIG. 3 (together with FIGS. 4A, 4B and 4C) illustrates certain additional aspects of a user interface design for a synthetic violin instrument in accordance with some embodiments of the present invention. In particular, FIG. 3 depicts user interaction in a songbook guided mode in which spatio-temporal cuing of note selection (i.e., of string length indicative gestures) and duration of a note sounding is provided in accordance with a musical score. The user is guided to particular string length indicative contact points on the multi-touch sensitive, which (upon actual finger contact) results in captured string length indicative gestures that are supplied to the digital synthesis. For example, scored coded note cue 301 guides the user to contact the visual depiction of string 312 at a particular length therealong consistent with note to be sounded in conjunction with a bowing- or plucking-type excitation indicative gesture. A "wave" depiction of vibrato cue 302 on the contacted string 312 is evocative of vibrato, which the user may gesture with slight back-and-forth movement (or wobble) of his/her finger contact. As previously described, it is notable that the actual stream of user gestures (here the left hand, ring finger contact, wobble and release along string 312 and the thumb contact, radial movement and release of the right hand on the rotating visual device 321) are what drive the digital synthesis as string length indicative and excitation indicative gestures. In a graded or lesson plan mode, notes are "scored" as hit when the contact point, timing and duration corresponds to visual cuing. Actual audible rendering is based on the actual gesture stream (including any premature or late bowing or string contact, any tonal variance from the musical score based on actual contact point, any vibrato wobble, or any acceleration/deceleration of the bow based on thumb movement).

Figure 4A:
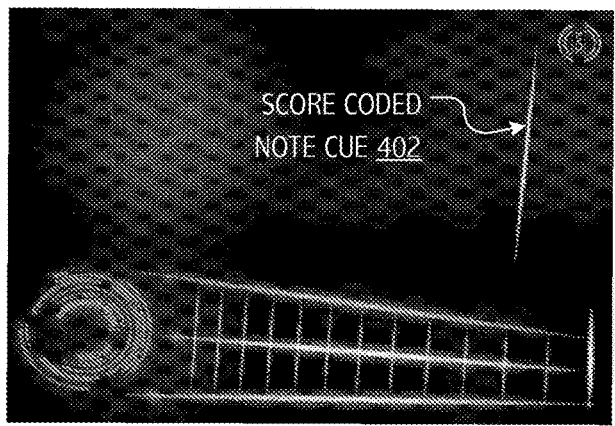
FIGS. 4A, 4B and 4C illustrate spatio-temporal cuing aspects of a user interface design for a synthetic violin instrument in accordance with some embodiments of the present invention.
Figure 4B:
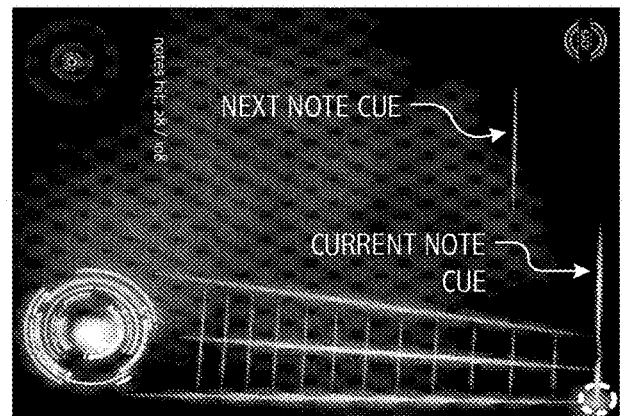
Figure 4C:
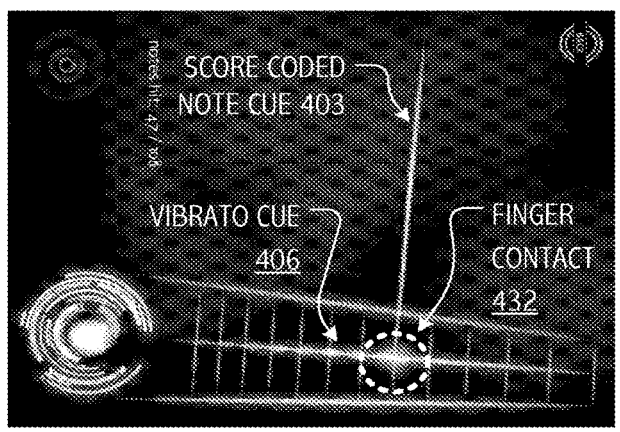

FIGS. 4A, 4B and 4C further illustrate (using a sequence of screen images) spatio-temporal cuing aspects of a user interface design for a synthetic violin instrument in accordance with some embodiments of the present invention. FIG. 4A illustrates a pair of temporally sequenced note cues (401, 402) presented in correspondence with an underlying score. The first to arrive note cue 401 suggests to the user a relatively short sounding of a note to be expressed by an F# indicative finger contact on the first string together with a bow contact indicative thumb or finger contact with the rotating bowing device 421. FIG. 4B illustrates a pair of temporally sequenced note cues, together with a vibrato cue 405 for the current note. FIG. 4C illustrates a note cue 403 suggestive of a relatively long expression of an E indicative finger contact on the second string, together with a vibrato cue 406 for the current note and a desired user finger contact position (432) in spatio-temporal correspondence with the underlying score.

Each of the aforementioned drawings (FIGS. 4A, 4B and 4C) illustrate a touch screen bowing device 421, wherein in accord with some embodiments of the present invention, finger/thumb contact gestures are indicative of bow contact and radial position codes bow traversal speed. Other visual devices may be employed to facilitate capture of excitation indicative gestures that parameterize bow contact, inclination, pressure and/or speed of travel. The illustrated visual device is but one suitable example. Likewise, although vibrato cues have been illustrated as visual ornamentation of a corresponding string, other visual cue forms may be employed such as in correspondence with note or chord sounding cues, a visual cuing entirely separate from string depictions and note/chord cues, as haptic feedback, etc.

Figure 5:
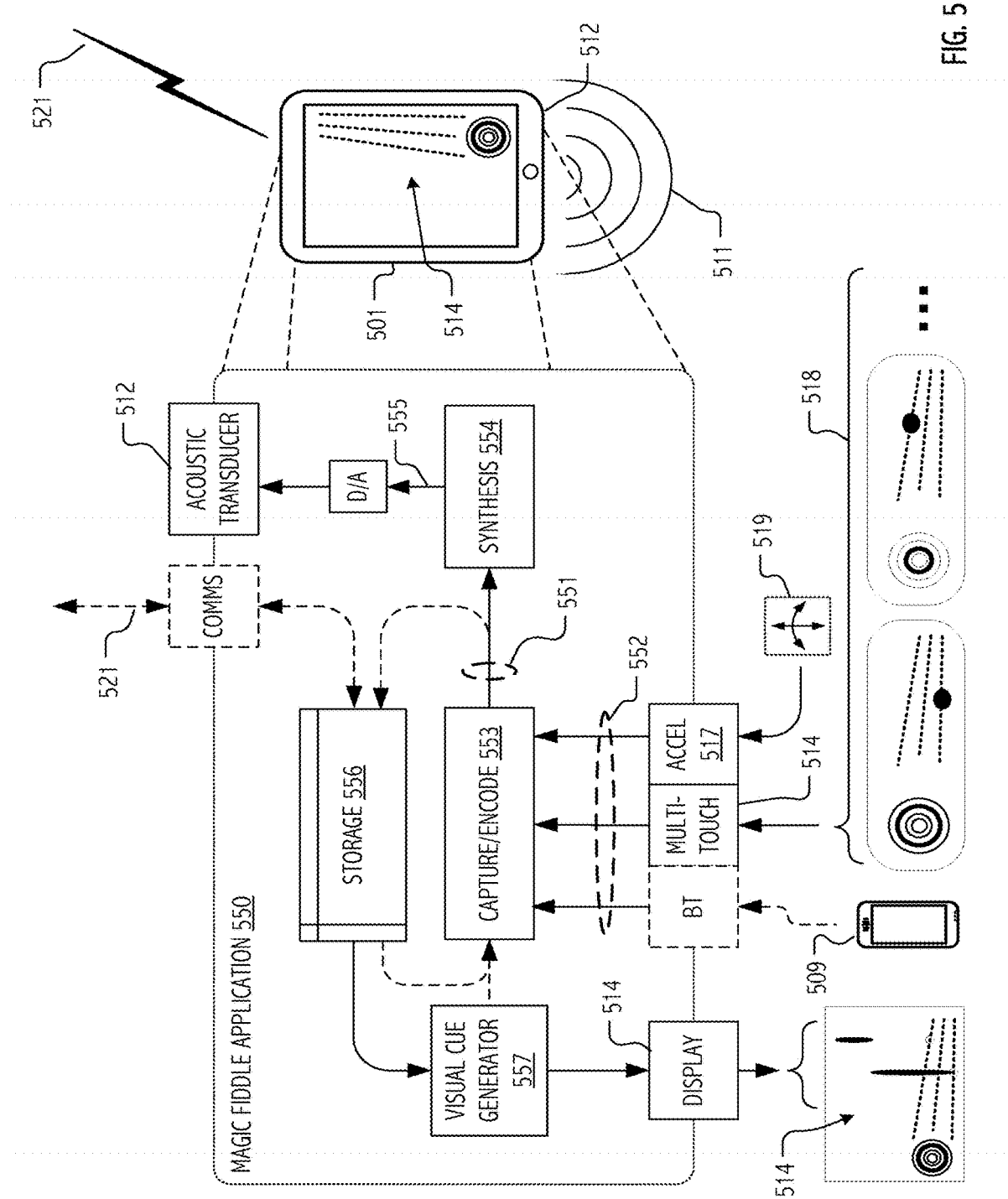
FIG. 5 is a functional block diagram that illustrates capture and encoding of user gestures corresponding to several notes of a performance on a synthetic violin instrument and acoustic rendering of the performance in accordance with some embodiments of the present invention.

FIG. 5 is a functional block diagram that illustrates capture and encoding of user gestures corresponding to several notes of a performance on a synthetic violin instrument and acoustic rendering (511) of the performance in accordance with some embodiments of the present invention. In particular, and as more particularly illustrated above relative to FIGS. 3, 4A, 4B and 4C, string, a bowing device, and score-coded visual cues are depicted on display 514 of a portable computing device 501 with a multi-touch sensitive display (here illustrated at form factor reminiscent of an iPad handheld, but more generally understood to be consistent with iPhone, iPod Touch or other portable computing devices at pad, phone, book reader or media player form factors). Consistent with the role in such devices of a multi-touch sensitive display as both an input and an output device, the multi-touch sensitive display (together with illustrative depictions thereon) is indicated in multiple places and roles thorough the drawing using a uniform reference 514.

As will be appreciated by persons of ordinary skill in the art, functionality illustrated as Magic Fiddle Application 550 includes application specific code executable on a processor of portable computing device 501 as well as firmware, operating system and/or embedded devices thereof. In general, particular allocations of functionality to application code, to firmware, to operating system constructs or to hardware of the portable computing device itself are matters of design choice and accordingly, any illustrated or described allocation (express or implied) may be subject to further design variation without departing from the spirit or scope of inventions described and claimed herein.

In the illustration of FIG. 5, a visual cue generator 557 (operable during songbook or lesson plan modes of operation) retrieves musical score information from storage 556 and, based thereon, supplies a sequence of visual cues to be presented on display 514 in correspondence with string and bowing device visuals. Although a user may (in general) express and sound whatever notes he/she desires by way of string length indicative and excitation indicative gestures on multi-touch sensitive display 514, often the user expresses (or at least attempts to express) a sequence of gestures (518) generally in correspondence with the visual cues and the musical score from which such visual cues are generated (557). In some cases, the musical score is demand supplied from a remote server or service via wireless data communications 512.

Depending on the implementation (or mode of operation) a variety of inputs (552) may feed the capture/encoding (553) to produce a gesture stream 551 supplied to synthesis 554. String length indicative gestures (e.g., finger contacts, vibrato indicative finger contact wobble, lateral travel of a finger contact along a string, etc.) and excitation indicative gestures (e.g., finger contacts in a string pluck region, thumb/finger contact at a rotating bowing device and accelerating/deceleration indicative travel thereacross) captured from multi-touch sensitive display 514 are collectively summarized as gestures 518. However, additional sources of user gestures may be supported in some embodiments. For example, in some embodiments, an accelerometer 517 input may be used to capture gestures (519) indicative of vibrato, trilling or some other ornamentation of the user's performance. In some embodiments, manipulation of a second portable device (e.g., handheld 509) may be detected and captured using accelerometer(s) onboard the second device and communicated to portable computing device 501 (and application 550 executing thereon) via a wired or wireless communications facility such as Bluetooth® communication. Bluetooth is a trademark of the Bluetooth special interest group (SIG).

Building upon gestures captured from multi-touch sensitive display 514 and suitably encoded (553), a gesture stream 551 is used to drive digital synthesis 554. In some embodiments, such a gesture stream 551 is stored (e.g., in storage 556) for possible or optional communication to a remote server, service platform or rendering device as part of a social media or collaboration interaction. Depending on the nature of digital synthesis, data communications and/or remote rendering, differing encodings or subset/superset gesture streams may be employed. In some embodiments, an encoding of the same gesture stream or even the same encoding of the same gesture stream may drive local digital synthesis 554 and audible rendering as well as a remote audible rendering or rendering to an audio encoding format.

Turning to digital synthesis 554, a variety of computational techniques may be employed and will be appreciated by persons of ordinary skill in the art. For example, exemplary techniques include (i) physical modeling of string vibration and acoustics of the modeled instrument and (ii) wavetable synthesis. In general, for certain types of string instruments, particularly the synthetic violin with bowed excitation used herein as a motivating example, physical modeling may provide a livelier, more expressive synthesis that is responsive (in ways similar to physical analogs) to the continuous and expressively variable excitation of constituent strings afforded by transverse bow travel and to the instantaneous variation of effective string length possible in a non-fretted string instrument. A suitable physical model based musical tone synthesis system is described in U.S. Pat. No. 5,587,548 naming Julius O. Smith, III as inventor, which is incorporated herein by reference for the limited purpose of describing suitable commuted synthesis-type (commuted synthesis of string and resonator) implementations of synthesis 554. Additional options include more literal physical models, which are generally less controllable but much more expressive. Techniques detailed in U.S. Pat. Nos. 5,448,010 and/or 5,212,334, each naming Julius O. Smith, III as inventor, or in J. O. Smith, *Efficient Simulation of the Reed-Bore and Bow-String Mechanisms*, in *Proceedings of the* 1986 *International Computer Music Conference*,

*The Hague*, pp. 275-280 (1986) are also suitable for some implementations in accordance with the present invention(s).

In an embodiment based on a commuted synthesis-type technique described in the '548 patent, particular excitation indicative gestures captured from 514 (e.g., bow-on-string indicative finger/thumb contact and traversal at a given speed or string plucking) are selective for a corresponding table-coded excitation signals e(n). In some embodiments, different tables (i.e., different excitation signals) may used for up bowing and for down bowing. Likewise, single vs. multi-string contact indicative gestures, attack gestures, and bow pressure indicative gestures (if supported) may be selective for respective and different excitation signals. In some embodiments, a table-coded excitation signal, e(n), may be up/down sampled to shift the apparent body size of the instrument. In general, filtering or other signal processing may be performed on the excitation signal in correspondence with bow acceleration or deceleration parameterization of excitation indicative gestures in the gesture stream.

A composite excitation signal formed as the superposition of various excitations mapped from the gesture stream is, in general, commuted with the modeled impulse response of the instrument as a resonator and introduced (as an aggregate excitation) as an input to a filtered delay loop wherein coarse and fine pitch control are respectively provided by delay line length and the loop filter. In synthetic violin implementations such as described herein, string length indicative gestures are mapped to manipulate pitch controls of the filtered delay loop. Output of the above-described synthesis (754) is converted to acoustic energy by acoustic transducer 512 to produce a synthetic audible rendering 511 in correspondence with the captured gesture stream 551 which expresses the user's performance.

Figure 6:
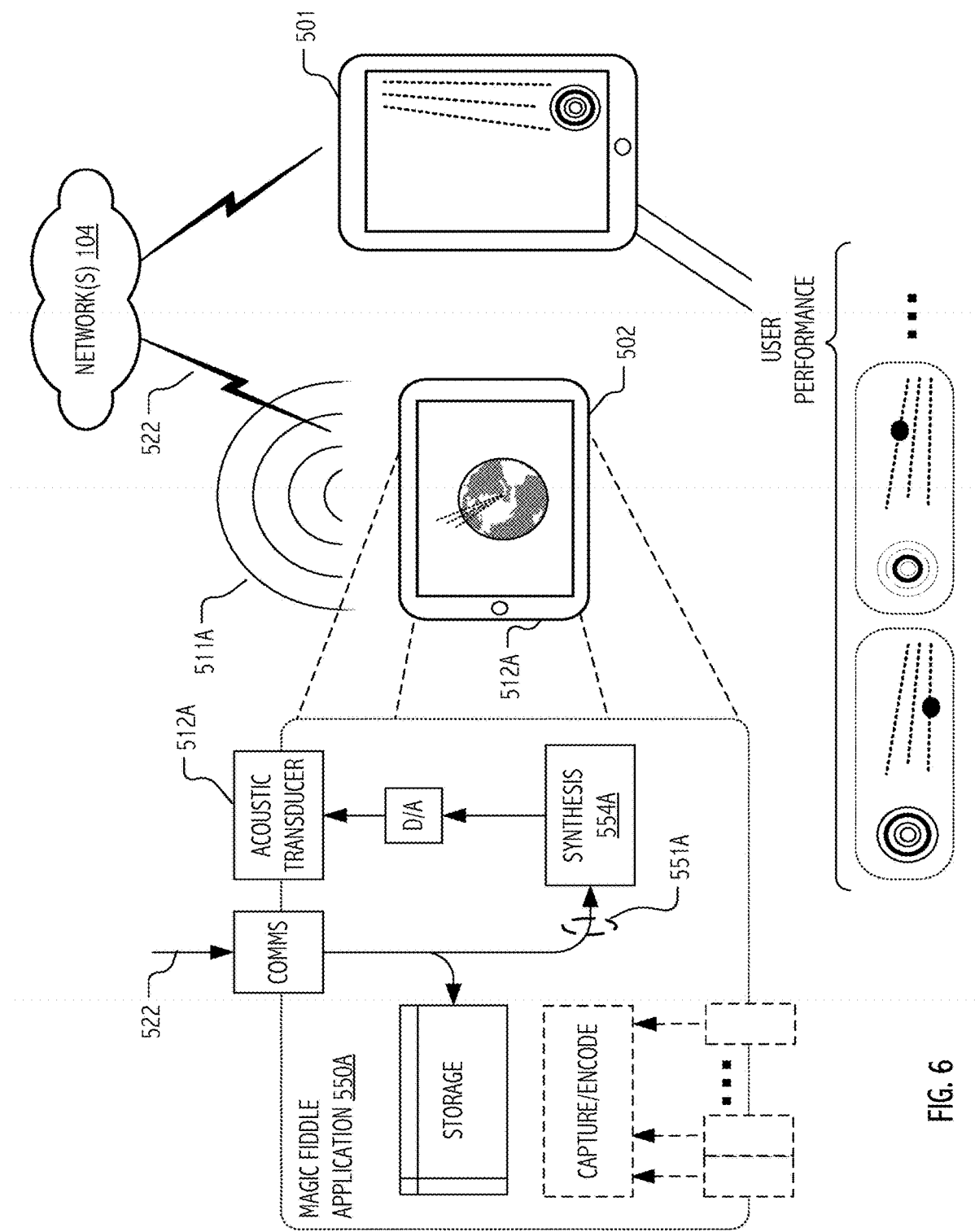
FIG. 6 is a functional block diagram that illustrates capture, encoding and transmission of a gesture stream encoding corresponding to a user performance on a synthetic violin instrument together with receipt of the gesture stream encoding and acoustic rendering of the performance on a remote device.

FIG. 6 is a functional block diagram that illustrates capture, encoding and transmission of a gesture stream encoding corresponding to a user performance on a synthetic violin instrument hosted on a first, portable computing device 501 together with receipt of the gesture stream encoding and acoustic rendering of the performance on a second, portable computing device 502 (typically remote from device 501) on which an instance (550A) of the above-described synthetic violin application is likewise hosted. Capture and encoding of a gesture stream (including string length indicative gestures and excitation indicative gestures) at portable computing device 501 is as described above with reference to FIG. 5. Likewise, processing of the gesture stream communicated (522) via network(s) 104 to the second device 501 as well as synthesis 554A thereon and rendering (511A) at acoustic transducer 512A thereof are also as described above with reference FIG. 5 and like facilities (synthesis 554 and acoustic transducer 512) illustrated therein.

It is notable that, in the above-described commuted synthesis implementation of synthesis 554, it is the combination of string length and excitation table repetition rate that makes for the pitch. Specifically, a body impulse response table is fired at the intended pitch, and the modeled string is set (and successively updated) to an appropriate length in correspondence with parameterization of string length indicative gestures from the gesture stream.

Figure 7:
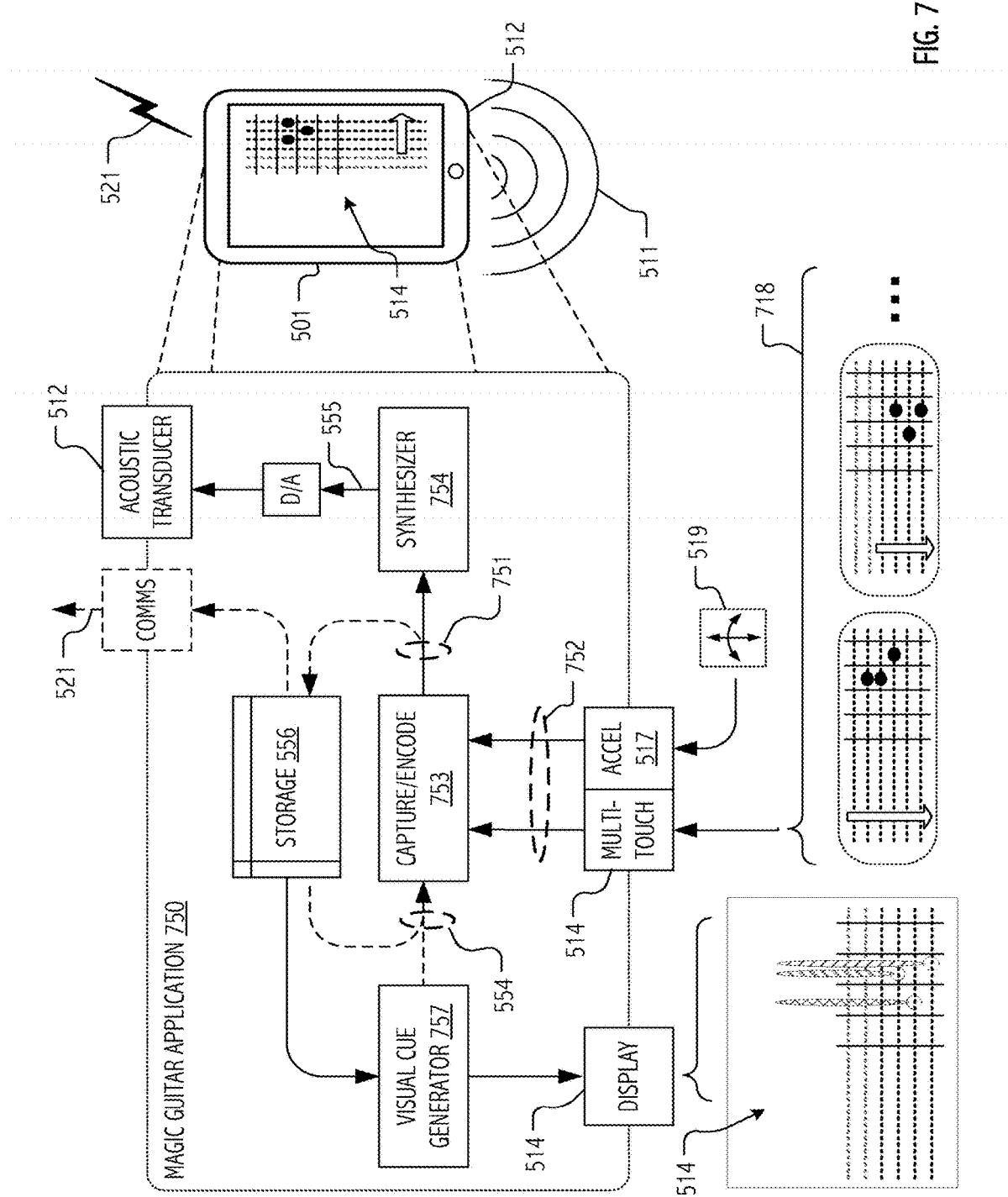
FIG. 7 is a functional block diagram that illustrates capture and encoding of user gestures corresponding to several chords of a performance on a synthetic guitar instrument and acoustic rendering of the performance in accordance with some embodiments of the present invention.

FIG. 7 illustrates a variation on the synthetic violin of FIG. 5, in which certain string length indicative gestures and excitation indicative gestures are adapted for a synthetic guitar implementation and to more closely correspond to physical instrument analogs familiar to a guitar player. Thus, a six string instrument is illustrated in which it will be understood that string length indicative gestures expressed by a user are selective for string lengths (of respective strings) quantized in accord with frets typical of guitar-type instrument. In particular, visual cues for finger contacts suggestive of chords to be sounded are generated by visual cue generator 757 from a musical score retrieved from storage 556. Although the set of visual cues supplied includes cues suggestive of fingerings for guitar chords, it will be understood that individual string fingerings (and visual cues therefor) may also be provided. In general, musical score based visual cuing techniques employed in a synthetic guitar implementation will be understood with reference to songbook and lesson plan modes previously described herein for synthetic violin implementations.

As before, while a user may (in general) express and sound whatever notes he/she desires by way of string length indicative and excitation indicative gestures on multi-touch sensitive display 514, often the user expresses (or at least attempts to express) a sequence of gestures (here 718) generally in correspondence with the visual cues and the musical score from which such visual cues are generated (757). Also as before and depending on the implementation (or mode of operation), a variety of inputs (752) may feed the capture/encoding (753) to produce a gesture stream 751 supplied to synthesis 754. Relative to FIG. 7, string length indicative gestures (e.g., finger contacts, lateral travel of a finger contact along a string, etc.) and excitation indicative gestures (e.g., strum-type finger travel gestures across all or a subset of the strings as well as pluck or pick-type finger contacts) captured from multi-touch sensitive display 514 are collectively summarized as gestures 718. Additional sources of user gestures may be supported in some embodiments. For example, in some embodiments, an accelerometer 517 input may be used to capture gestures (519) indicative of vibrato, trilling or some other ornamentation of the user's performance.

As will be appreciated, string length indicative gestures for fingerings of respective strings (including implicitly string lengths of open unfingered strings) are illustrated (in gesture sequence 718) for successive E major and D major chords. As will be further appreciated, string excitation indicative gestures (e.g., strum-type finger travel) across all or the subset of strings corresponding to a given chord may be expressed by the user. In each case, the string length indicative and string excitation indicative gestures are captured and encoded (753) are supplied as an input to digital synthesis 754 of the guitar and its constituent strings.

Turning to digital synthesis 754, a variety of computational techniques may be employed and will be appreciated by persons of ordinary skill in the art. For example, as before, physical modeling of string vibration and acoustics of the modeled instrument may be employed in a manner analogous to that described above with reference to digital synthesis of a violin. Nonetheless, given the generally simplified excitation and string length variation opportunities afforded in a guitar-type instrument, a commuted synthesis-type physical model of the guitar may be unnecessary (and indeed computationally excessive) in some embodiments. Instead, computational techniques such as wavetable synthesis may be employed. Wavetable synthesis techniques are well known in the art and, any of a variety of suitable techniques may be employed. As with the previously described implementations, string excitation indicative gestures and string length indicative gestures actually expressed by the user drive a wavetable digital synthesis.

Figure 8:
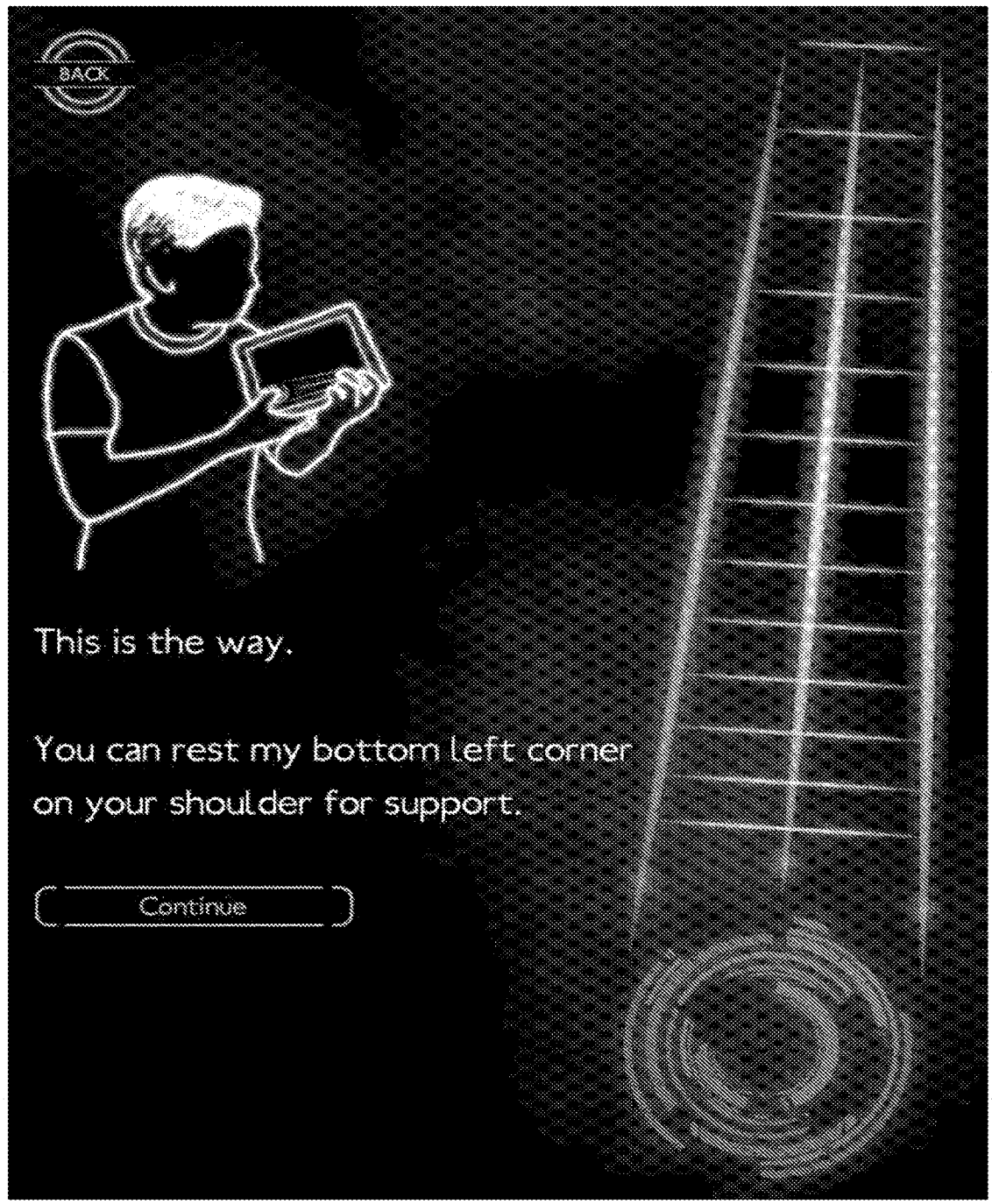
FIG. 8 illustrates certain aspects of a user interface design for a storybook teaching mode of a synthetic violin instrument in accordance with some embodiments of the present invention.

FIG. 8 is a screen shot depicting certain aspects of a user interface design for a storybook teaching mode of a synthetic violin instrument in accordance with some embodiments of the present invention. In addition to basic textual, graphical and feedback assisted instruction regarding fingering techniques, bow contact gestures, etc., storybook lesson plans present exercises (typically as visually cued performances corresponding to an underlying musical score) at successive levels of difficulty. Grading, or points awarded in a game or competition framework, are based on correspondence of the user/musician's actual expression (by way of captured string length indicative and string excitation indicative gestures) with note selections, durations, timings and even score coded performance figures such as vibrato, trills, string bending, etc. In this way, correspondence with (or variances from) a desired exercise, lesson, or selection for recital-type competition, including (i) well timed, premature or late bowing or string contact, (ii) tonal variance from the musical score based on actually expressed string contacts, (iii) well or poorly expressed vibrato and/or (iv) desired or undesired acceleration/deceleration of the bow based on thumb movement may be accounted for in the form of performance grading and/or feedback.

Exemplary Portable Computing Device Platforms and Network Configurations

Figure 9:
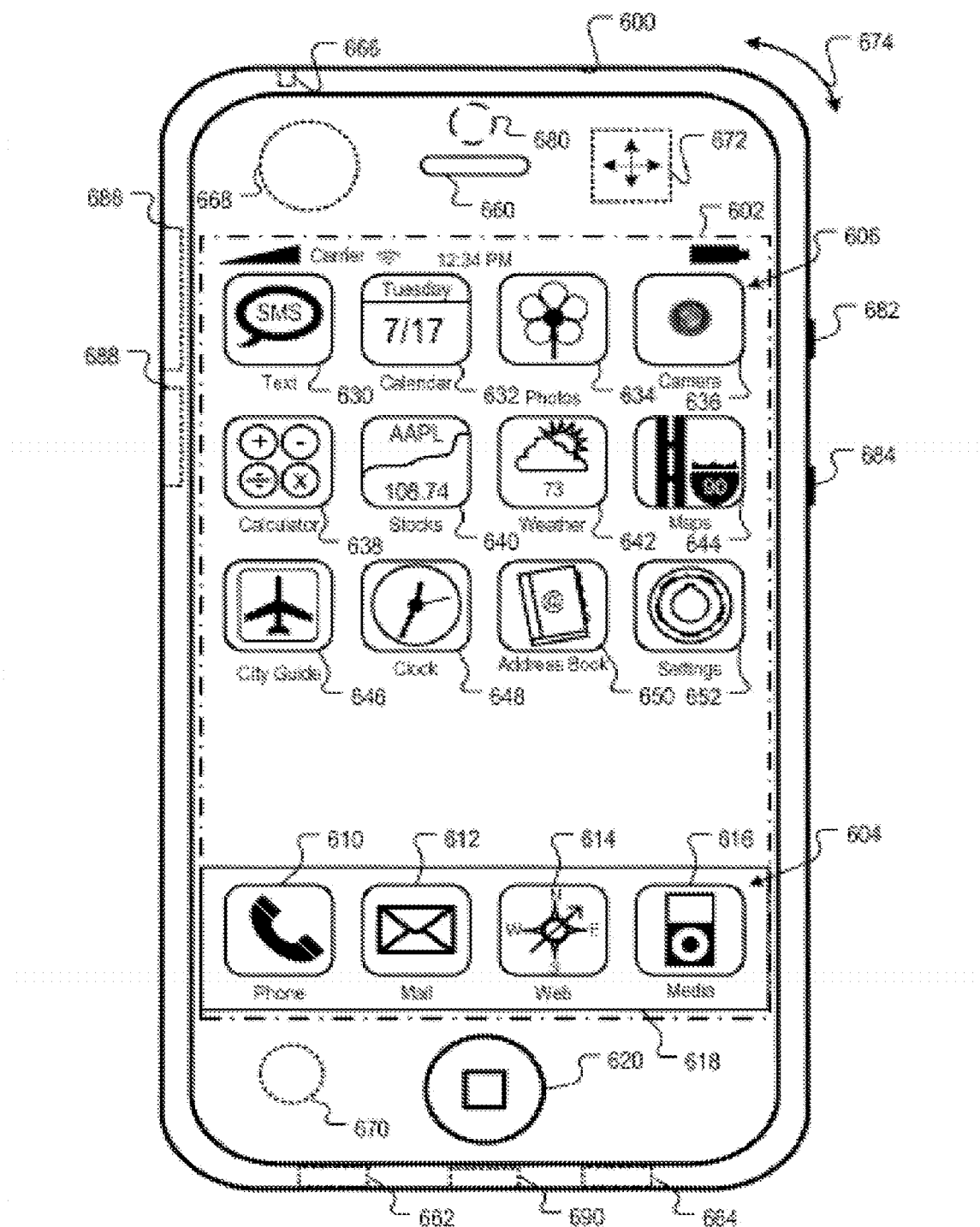
FIG. 9 illustrates features of a mobile device that may serve as a platform for execution of software implementations in accordance with some embodiments of the present invention.

FIG. 9 illustrates features of a mobile device that may serve as a platform for execution of software implementations in accordance with some embodiments of the present invention. More specifically, FIG. 9 is a block diagram of a mobile device 600 that is generally consistent with commercially-available versions of iPhone™ and iPod Touch™ mobile digital devices or, at a larger form factor, with an iPad™ computing tablet, each executing a version of the iOS operating system available from Apple Inc. Although embodiments of the present invention are certainly not limited to iPhone, iPod or iPad deployments or applications (or even iOS devices), the iPhone device, together with its rich complement of sensors, multimedia facilities, application programmer interfaces and wireless application delivery model, provides a highly capable platform on which to deploy certain implementations. Based on the description herein, persons of ordinary skill in the art will appreciate a wide range of additional mobile device platforms that may be suitable (now or hereafter) for a given implementation or deployment of the inventive techniques described herein.

Summarizing briefly, mobile device 600 includes a display 602 that can be sensitive to haptic and/or tactile contact with a user. Touch-sensitive display 602 can support multi-touch features, processing multiple simultaneous touch points, including processing data related to the pressure, degree and/or position of each touch point. Such processing facilitates gestures and interactions with multiple fingers, chording, and other interactions. Of course, other touch-sensitive display technologies can also be used, e.g., a display in which contact is made using a stylus or other pointing device.

Typically, mobile device 600 presents a graphical user interface on the touch-sensitive display 602, providing the user access to various system objects and for conveying information. In some implementations, the graphical user interface can include one or more display objects 604, 606. In the example shown, the display objects 604, 606, are graphic representations of system objects. Examples of system objects include device functions, applications, windows, files, events, alerts, or other identifiable system objects. In some embodiments of the present invention, applications, when executed, provide at least some of the digital acoustic functionality described herein.

Typically, the mobile device 600 supports network connectivity including, for example, both mobile radio and wireless internetworking functionality to enable the user to travel with the mobile device 600 and its associated network-enabled functions. In some cases, the mobile device 600 can interact with other devices in the vicinity (e.g., via Wi-Fi, Bluetooth, etc.). For example, mobile device 600 can be configured to interact with peers or a base station for one or more devices. As such, mobile device 600 may grant or deny network access to other wireless devices.

Mobile device 600 includes a variety of input/output (I/O) devices, sensors and transducers. For example, a speaker 660 and a microphone 662 are typically included to facilitate audio, such as the audible rendering of musical performances as described elsewhere herein. In some embodiments of the present invention, speaker 660 and microphone 662 may provide appropriate transducers for techniques described herein. An external speaker port 664 can be included to facilitate hands-free voice functionalities, such as speaker phone functions. An audio jack 666 can also be included for use of headphones and/or a microphone.

Other sensors can also be used or provided. A proximity sensor 668 can be included to facilitate the detection of user positioning of mobile device 600. In some implementations, an ambient light sensor 670 can be utilized to facilitate adjusting brightness of the touch-sensitive display 602. An accelerometer 672 can be utilized to detect movement of mobile device 600, as indicated by the directional arrow 674. Accordingly, display objects and/or media can be presented according to a detected orientation, e.g., portrait or landscape. In some implementations, mobile device 600 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate geocodings described herein. Mobile device 600 can also include a camera lens and sensor 680. In some implementations, the camera lens and sensor 680 can be located on the back surface of the mobile device 600.

Mobile device 600 can also include one or more wireless communication subsystems, such as an 802.11b/g communication device, and/or a Bluetooth™ communication device 688. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc. A port device 690, e.g., a Universal Serial Bus (USB) port, or a docking port, or some other wired port connection, can be included and used to establish a wired connection to other computing devices, such as other communication devices 600, network access devices, a personal computer, a printer, or other processing devices capable of receiving and/or transmitting data. Port device 690 may also allow mobile device 600 to synchronize with a host device using one or more protocols, such as, for example, the TCP/IP, HTTP, UDP and any other known protocol.

Figure 10:
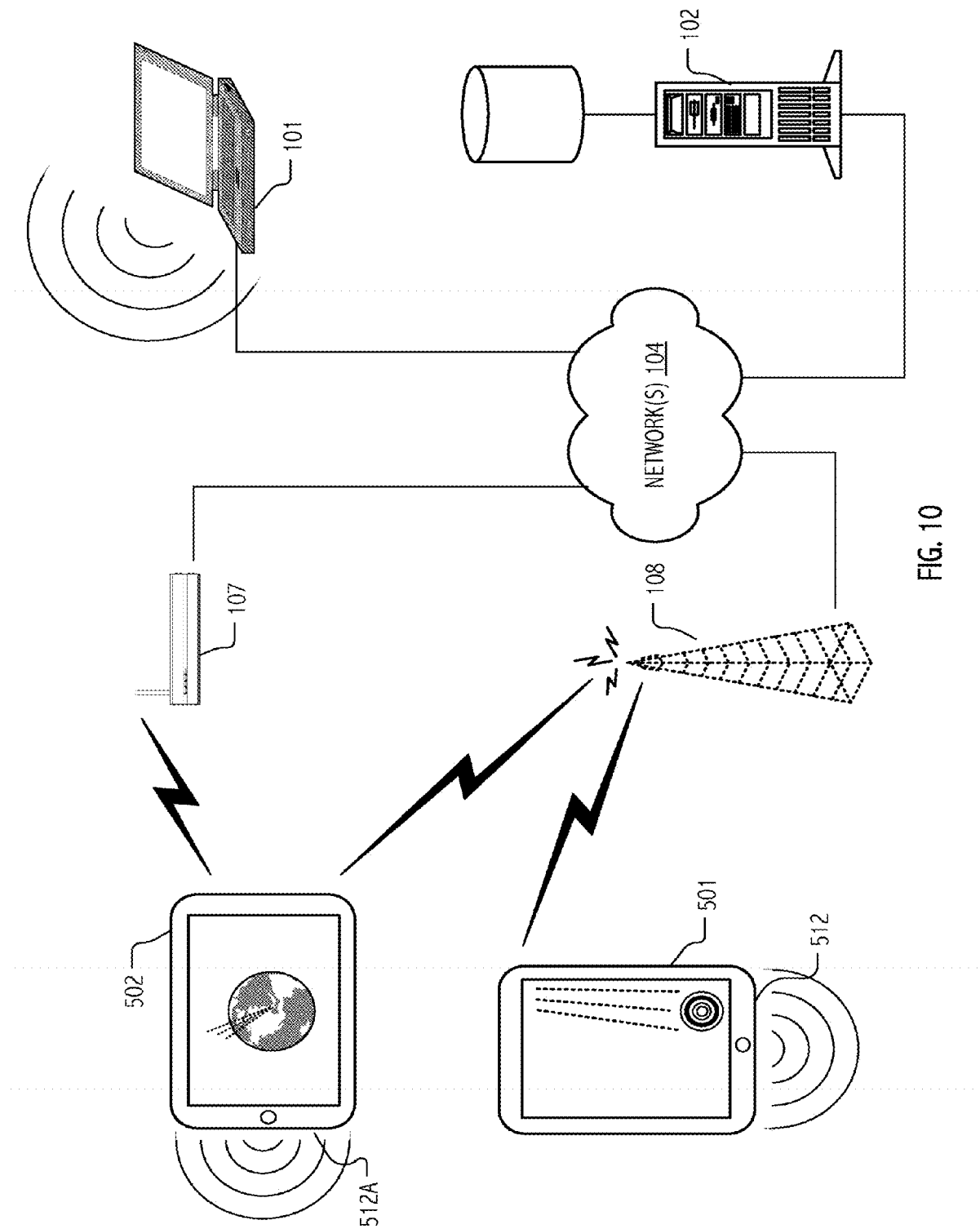
FIG. 10 is a network diagram that illustrates cooperation of exemplary devices in accordance with some embodiments of the present invention.

FIG. 10 illustrates instances (501, 502) of a portable computing device such as mobile device 600 programmed with user interface code, gesture capture code and digital synthesis code for a synthetic string instrument in accord with the functional descriptions herein. Device instance 501 operates in a visual cuing and performance capture mode and supplies a gesture stream to device instance 502 for local digital synthesis and audible rendering. Device instance 501 may also supply one or more devices e.g., mobile device instance 501, laptop computer 101 or server 102 with a rendering of the user's performance to a media encoding. Illustrated devices communicate (and data described here is communicated therebetween) using any suitable wireless data (e.g., carrier provided mobile services, such as GSM, 3G, CDMA, WCDMA, 4G, 4G/LTE, etc. and/or WiFi, WiMax, etc.) including any intervening networks 104 using facilities (exemplified as access point 107 and telco tower 108, and server 102).

Other Embodiments

While the invention(s) is (are) described with reference to various embodiments, it will be understood that these embodiments are illustrative and that the scope of the invention(s) is not limited to them. Many variations, modifications, additions, and improvements are possible. For example, while particular violin- and guitar-type embodiments, user interface constructs and gesture sets have been emphasized in the description, other multi-string instruments and other variations on the user interfaces and gesture sets will be appreciated based on the description herein. For example, although synthetic multi-string instrument have been depicted with user interface and gesture constructs that visually present a multiplicity of strings, it will be understood that some variations may devolve a multiplicity of parallel strings and associated visual cues onto a single string user interface and visual cuing model. In such single string variations on the embodiments more exhaustively described herein, it will be appreciated that notes that (in the physical analog) would be sounded on respective ones of the plural strings are instead coded and expressed by finger contacts (typically as a laterally displaced tonal scale) on a single string visual representation.

Likewise, while certain illustrative signal processing techniques have been described in the context of certain illustrative applications, persons of ordinary skill in the art will recognize that it is straightforward to modify the described techniques to accommodate other suitable signal processing techniques and effects. Particular commuted synthesis physical models and wavetable synthesis techniques referenced herein are merely exemplary.

Embodiments in accordance with the present invention may take the form of, and/or be provided as, a computer program product encoded in a machine-readable medium as instruction sequences and other functional constructs of software, which may in turn be executed in a computational system (such as a iPad, iPhone, iPod Touch handheld, mobile device or portable computing device) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
displaying on a multi-touch sensitive display of a portable computing device, and in correspondence with a musical score, temporally synchronized visual cues relative to respective strings of a synthetic string instrument;
capturing user gestures indicative of length of respective strings of the synthetic string instrument from data sampled in correspondence with respective finger contacts with the multi-touch sensitive display along visual depictions of the respective strings;
encoding a gesture stream for a performance of the user by parameterizing at least a subset of the string length indicative user gestures; and
audibly rendering the performance on the portable computing device using the encoded gesture stream as an input to a digital synthesis of the synthetic string instrument executing on the portable computing device, wherein the captured gesture stream, and not the musical score itself, drives the digital synthesis.

2. The method of claim 1, wherein one or more of the visual cues provides a duration of a note sounding in accordance with the musical score.

3. The method of claim 2, wherein the visual cues include a first visual cue indicative of a first duration of a first note on a first string and a second visual cue indicative of a second duration of a second note on a second string of the synthetic string instrument.

4. The method of claim 3, wherein the first duration is different from the second duration.

5. The method of claim 1, further comprising:
capturing user gestures indicative of excitation of at least one of the strings.

6. The method of claim 5, wherein encoding the gesture stream includes encoding the gesture stream by parameterizing at least a subset of the string excitation indicative user gestures.

7. The method of claim 5, further comprising:
displaying a rotating visual on the multi-touch sensitive display, wherein the captured string excitation indicative gestures include a bow traversal gesture indicated by contact of the user's thumb or finger with the rotating visual.

8. The method of claim 7, wherein the digital synthesis includes a model of acoustic response for one of a violin, a viola, a cello and a double bass.

9. The method of claim 1, further comprising:
capturing, by an accelerometer embedded in the portable computing device, device motion of the portable computing device.

10. The method of claim 9, wherein encoding the gesture stream includes encoding the gesture stream by parameterizing at least a subset of the captured device motion.

11. The method of claim 1, wherein the string length indicative user gestures include lateral travel of a finger contact along a string of the synthetic string instrument.

12. The method of claim 1, further comprising:
presenting on the multi-touch sensitive display of the portable computing device, and in correspondence with the musical score, temporally synchronized haptic feedback cues that include the indication to contact at least one of the respective strings at a particular length.

13. The method of claim 12, further comprising:
presenting on the multi-touch sensitive display of the portable computing device, and in correspondence with the musical score, temporally synchronized haptic feedback cues that include the indication to excite the at least one of the respective strings.

14. A computer program product encoded in one or more media, the computer program product including instructions executable on a processor of the portable computing device to cause the portable computing device to perform the method of claim 1.

15. The computer program product of claim 14, wherein the one or more media are readable by the portable computing device or readable incident to a computer program product conveying transmission to the portable computing device.

16. An apparatus comprising:
a portable computing device having a multi-touch display interface; and
machine readable code executable on the portable computing device to display on the multi-touch sensitive display of the portable computing device, and in correspondence with a musical score, temporally synchronized visual cues relative to respective strings of a synthetic string instrument;
the machine readable code further executable to capture user gestures indicative of length of respective strings of the synthetic string instrument from data sampled in correspondence with respective finger contacts with the multi-touch sensitive display along visual depictions of the respective strings;
the machine readable code further executable to encode a gesture stream for a performance of the user by parameterizing at least a subset of the string length indicative user gestures; and
the machine readable code further executable to audibly render the performance on the portable computing device using the encoded gesture stream as an input to a digital synthesis of the synthetic string instrument executing on the portable computing device, wherein the captured gesture stream, and not the musical score itself, drives the digital synthesis.

17. The apparatus of claim 16, embodied as one or more of a compute pad, a handheld mobile device, a mobile phone, a laptop or notebook computer, a personal digital assistant, a smart phone, a media player, a netbook, and a book reader.

18. A computer program product encoded in media and including instructions executable to implement a synthetic musical instrument on a portable computing device having a multi-touch display interface, the computer program product encoding and comprising:
instructions executable to capture user gestures indicative of length of respective strings of the synthetic string instrument from data sampled in correspondence with respective finger contacts with the multi-touch sensitive display along visual depictions of the respective strings;
further instructions executable to encode a gesture stream for a performance of the user by parameterizing at least a subset of the string length indicative user gestures;
further instructions executable to audibly render the performance on the portable computing device using the encoded gesture stream as an input to a digital synthesis of the synthetic string instrument executing on the portable computing device; and
further instructions executable to display on the multi-touch sensitive display of the portable computing device, and in correspondence with a musical score, temporally synchronized visual cues to guide the user's gestures relative to the respective strings of the synthetic string instrument, wherein the captured gesture stream, and not the musical score itself, drives the digital synthesis.

19. The computer program product of claim 18, wherein one or more of the visual cues provides a duration of a note sounding in accordance with the musical score.

20. The computer program product of claim 19, wherein the visual cues include a first visual cue indicative of a first duration of a first note on a first string and a second visual cue indicative of a second duration of a second note on a second string of the synthetic string instrument.

* * * * *